(12) United States Patent
Gapontsev et al.

(10) Patent No.: US 8,724,945 B2
(45) Date of Patent: May 13, 2014

(54) HIGH POWER FIBER LASER SYSTEM WITH INTEGRATED TERMINATION BLOCK

(75) Inventors: Valentin P. Gapontsev, Worcester, MA (US); Alexander Makagon, Dillenburg (DE); Dimitri Yagodkin, Burbach (DE)

(73) Assignee: IPG Photonics Corporation, Oxford, MA (US)

( * ) Notice: Subject to any disclaimer, the term of this patent is extended or adjusted under 35 U.S.C. 154(b) by 701 days.

(21) Appl. No.: 12/833,126

(22) Filed: Jul. 9, 2010

(65) Prior Publication Data

US 2012/0008648 A1    Jan. 12, 2012

(51) Int. Cl.
*G02B 6/26* (2006.01)
*G02B 6/42* (2006.01)

(52) U.S. Cl.
USPC ............................................. 385/38; 385/43

(58) Field of Classification Search
USPC ....................................... 385/38, 43
See application file for complete search history.

(56) References Cited

U.S. PATENT DOCUMENTS 4,807,954 A * 2/1989 Oyamada et al. ............... 385/43
7,190,511 B2   3/2007 Galvanauskas et al.

OTHER PUBLICATIONS

OPTOSCAND Manual, Jan. 22, 2007 p. 7.

* cited by examiner

*Primary Examiner* — Charlie Peng
*Assistant Examiner* — Mary El Shammaa
(74) *Attorney, Agent, or Firm* — Yuri Kateshov, Esq.; Tim King, Esq.

(57) ABSTRACT

The present disclosure is a system for the protection of a fiber within a laser system. The system has a water-cooled housing supporting a termination block, which is operative to shield a protective layer of a delivery fiber from back-reflected beams of light. The termination block is manufactured from quartz and is frustconical in configuration and fuseable to the delivery fiber. The delivery fiber has a polymeric protective layer with an acceptance end and a delivery end, and passes through a washer contained within the housing; the washer has a dielectric reflective coating. The system has at least one terminal block connector which further comprises a cone termination block, a reflector, and a set of light guards. The cone termination block is spliced to an output end of the delivery fiber and produces an angle λ so as to reduce propagation of back-reflected light. The reflector is positioned so as to block additional back-reflected light from the protective layer of the delivery fiber.

20 Claims, 7 Drawing Sheets

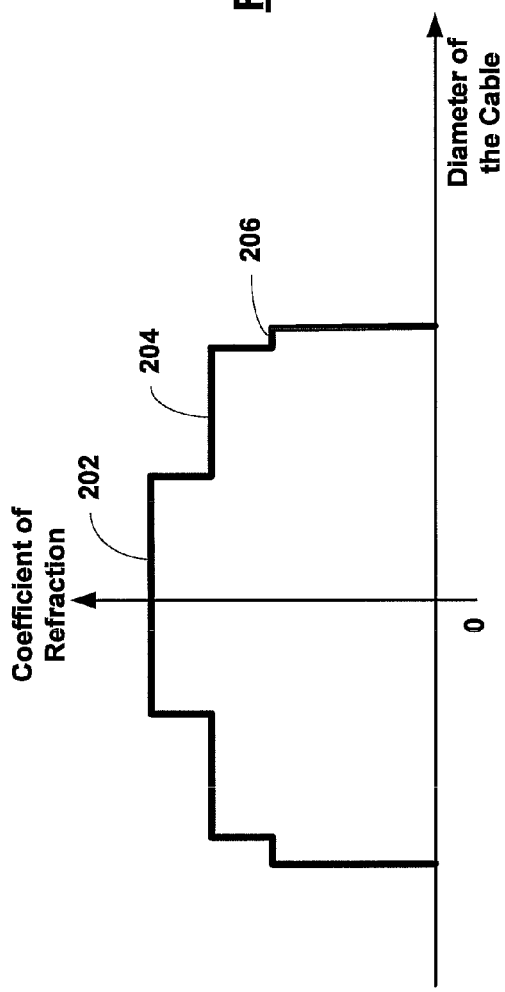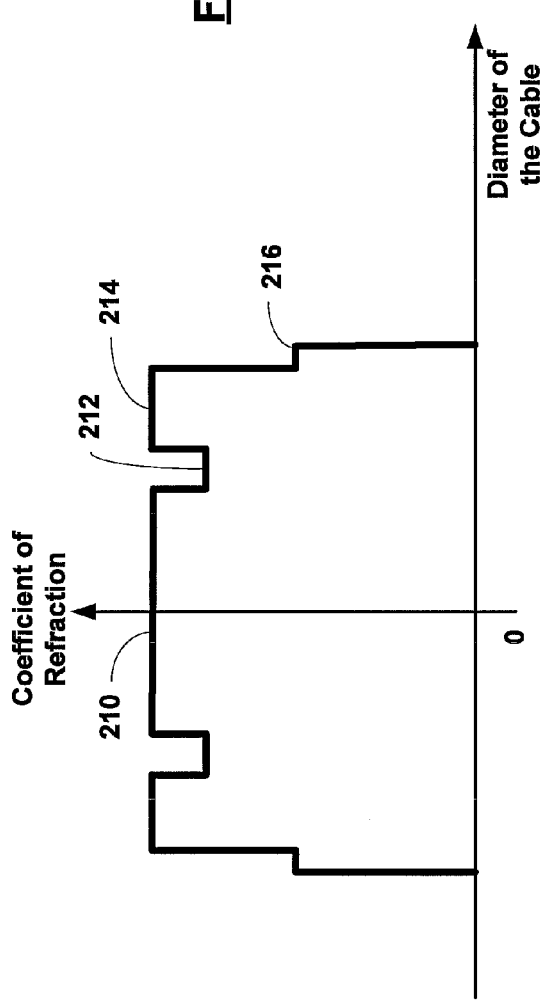

HIGH POWER FIBER LASER SYSTEM WITH INTEGRATED TERMINATION BLOCK

BACKGROUND OF THE DISCLOSURE

1. Field of the Disclosure

The present disclosure relates to a high power fiber laser system having an integrated termination assembly. More specifically, the present disclosure relates to a fiber optic system having a termination block with an optimized angle of projection together with a reflector for creating total internal reflection and minimizing the coupling of back-reflected beams into the cladding of the fiber upstream from the block.

2. Description of the Related Art

The related art involves the use of high performance fiber optic fibers to deliver a light beam to the surface of a workpiece. Under some circumstances, these fibers terminate in a housing that may be water-cooled. The reflected radiation from the surface of the workpiece or other thermal absorption is accomplished by the water as is known to those of skill in the art. See for example, U.S. Pat. No. 6,167,177 which issued Dec. 26, 2000 to Sandstrom et al. Though these fibers may be designed for withstanding high levels of back-reflected light from the projected beam or other damage, known solutions to the back-reflection that re-enters the fiber housing may not be effective.

FIG. 1 illustrates an output fiber optic system 100 of high power fiber laser including a protective layer 115, which surrounds a delivery fiber 112 and at least one terminal connector, including conventional bulk optics 122 of conventional types known to those of skill in the art. Internally, the terminal block connector is configured with a cone termination block 114 spliced to the output end of delivery fiber 112. The fiber optic system 100 may be used for a variety of applications, such as cutting; welding; and other operations associated with a workpiece surface 118. During irradiation of workpiece surface 118 by output radiation 116, back reflected light 120 propagates backwards through bulk optics 122 into block 114 and, if not treated properly, may be damaging to system 100, as discussed further below.

Typically, block 114 has a cylindrical cross-section. To the detriment of laser fiber 100, when a portion of scattered back-reflected light 120 is incident on the surface of block 114, some of the light is coupled into a core 111 and some is coupled into a cladding 113 of fiber 112 and some of light is coupled directly to a protective layer 115. The damage of protective layer 115 by back reflected light inevitably leads to the complete destruction of at least the terminal part of the fiber laser system.

Accordingly, there is a need for an improved means for reducing or eliminating back-reflected light from entering the delivery portion of a fiber lager system and causing overheating of the fiber's protective polymeric coatings or protective cladding, and other structures, which would lead to damage of the system.

SUMMARY OF THE DISCLOSURE

This need is satisfied by a disclosed fiber laser system providing an effective configuration for reducing or eliminating back-reflected light from entering the delivery fiber portion of a laser system. In particular, the present disclosure provides for an angle of cone-termination block which would prevent back-reflected light from penetrating through the cone termination block and coupling into the fiber's outer cladding or protective coating.

The present disclosure is a system for the protection of optical fibers of a laser system. The system may have a water-cooled housing supporting a termination block, which is operative to protect a coating of a delivery fiber from back-reflected light. The termination block is manufactured from quartz, has a frustoconical cross-section and is operatively coupleable to the downstream end of the delivery fiber. The delivery fiber has a protective layer, such as a polymeric coating or outer cladding, extending along a portion of the inner cladding.

The housing further supports a termination block, a reflector upstream from the block and surrounding the delivery fiber so as to block back-reflected light propagating along the housing over free space. Also located within the housing is a fiber light guard arrangement minimizing coupling of back-reflected light into the protective layer.

Alternatively, the disclosed system may have fused delivery and end fibers. The end fiber has a cladding defining the outer diameter which is substantially equal to the upstream end of the termination block. On the other hand, the outer diameter of the end fiber is smaller than that one of the delivery fiber. As a consequence, the power of backreflected light coupled into the downstream end of the cladding of the delivery fiber is rather insignificant. The backreflected light, thus, when coupled into the cladding of the delivery fiber, may not be damaging to its protective layer.

Still a further modification of the disclosed system includes a delivery fiber provided with an outer cladding sandwiched between the protective coating and inner cladding. The index of refraction of the additional cladding is smaller than that one of the inner cladding and, thus, prevents coupling of the inner-cladding guided light into the protective coating.

The above, and other aspects, features and advantages of the present disclosure will become apparent from the following description read in conjunction with the accompanying drawings, in which like reference numerals designate the same elements.

BRIEF DESCRIPTION OF THE DRAWINGS

FIG. 6A illustrates a refractive index profile of a delivery fiber depicted in FIG. 5.

FIG. 6B there is shown a refractive index profile for a multi-clad fiber having additional claddings as compared to the fiber of FIG. 6A.

SPECIFIC DESCRIPTION

Figure 1:
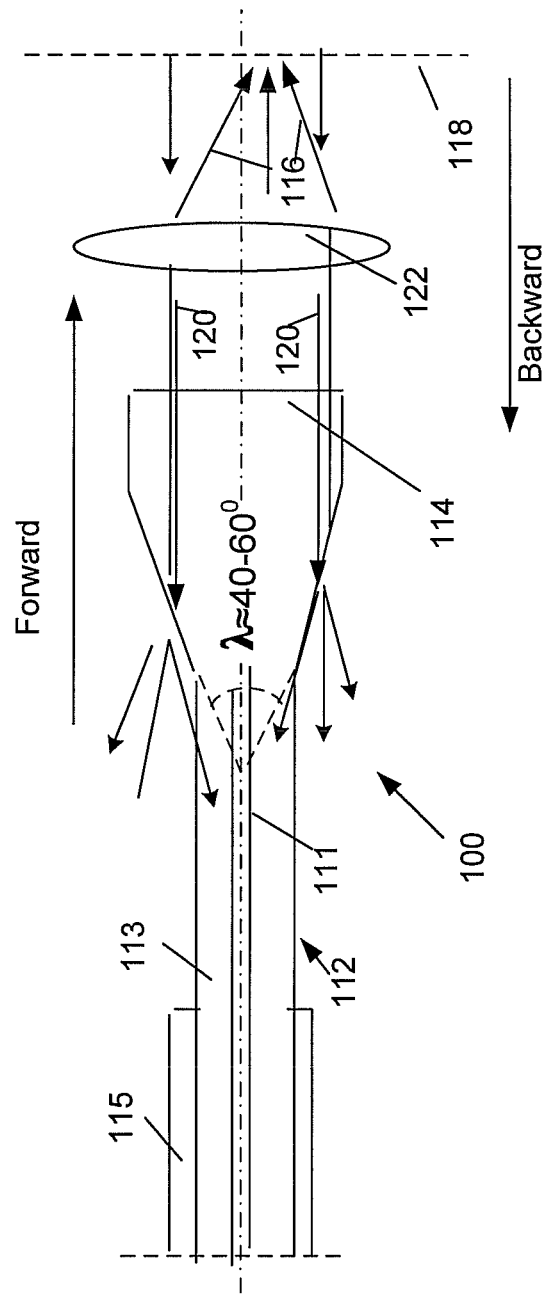
FIG. 1 is a diagram of a conventional art embodiment of a fiber laser system provided with an integrated termination block.

Reference will now be made in detail to several embodiments of the disclosure that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms may be used with respect to the drawings. The words "connect," "couple," and similar terms with their inflectional morphemes do not necessarily denote direct and immediate connections, but also include connections through mediate elements or devices.

Figure 2:
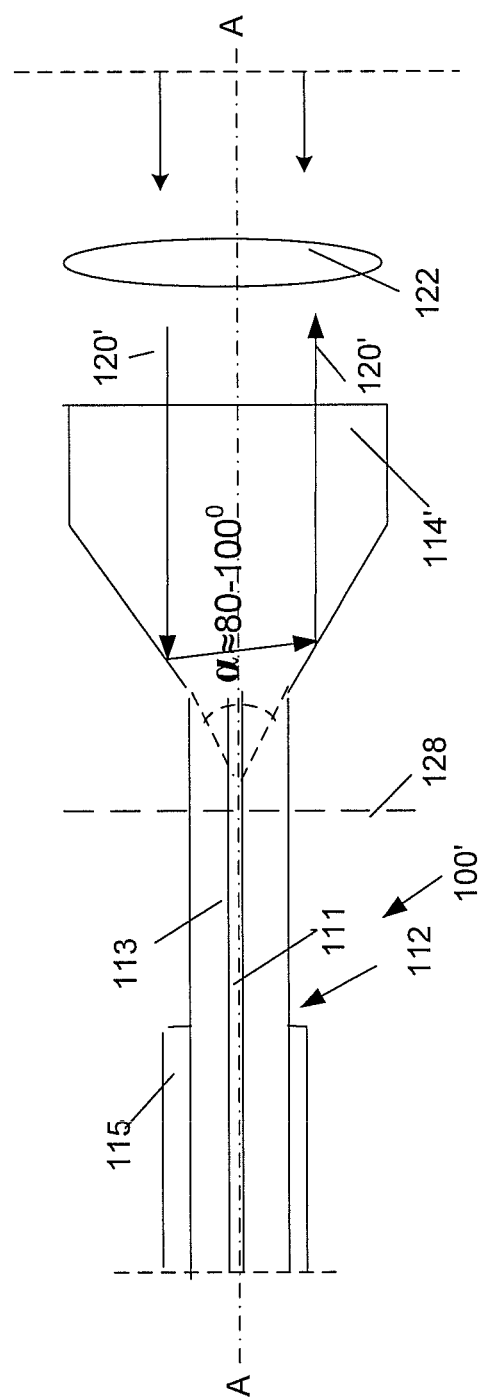
FIG. 2 is a diagram of the preferred embodiment of the present disclosure.

In contrast to the conventional art, the present disclosure, as illustrated in FIG. 2, includes a termination assembly provided with a frusto-conical quartz block 114' which has a substantially larger angle a which is between about 65 and 110 degrees. However, since the cone angle, as known, depends from a variety of factors, such as a refractive index, the referred to diapason is not limiting. A desirable angle is approximately 90 degrees. Such an angle $\alpha$ allows for back-reflected light 120' passing through bulk optics 122 at certain angles with respect to an optical axis A-A to substantially undergo a total internal reflection. As a consequence, instead of propagating within a housing towards downstream ends 112 of a protective coating or cladding 115 of fiber 100' (as happens in the conventional art), back-reflected light 120' exits block 114' in a forward direction toward optics 122.

Since back-reflected light 120' tends to scatter, it is not always propagated parallel to optical axis A-A. As a result, a portion of this light may still be able to propagate through block 114' in a backward direction. To prevent this light from damaging polymeric coating or outer cladding 115, a coated washer or reflector 128 is positioned perpendicular to an axis A-A' so as to prevent further propagation, of back-reflected light 120' towards the coating 115. The reflector 128 may be, of any shape (for example square, polygonal, ovoidal, etc.) sufficient to closely surround the beam and to operably reflect back-reflective light.

Figure 3:
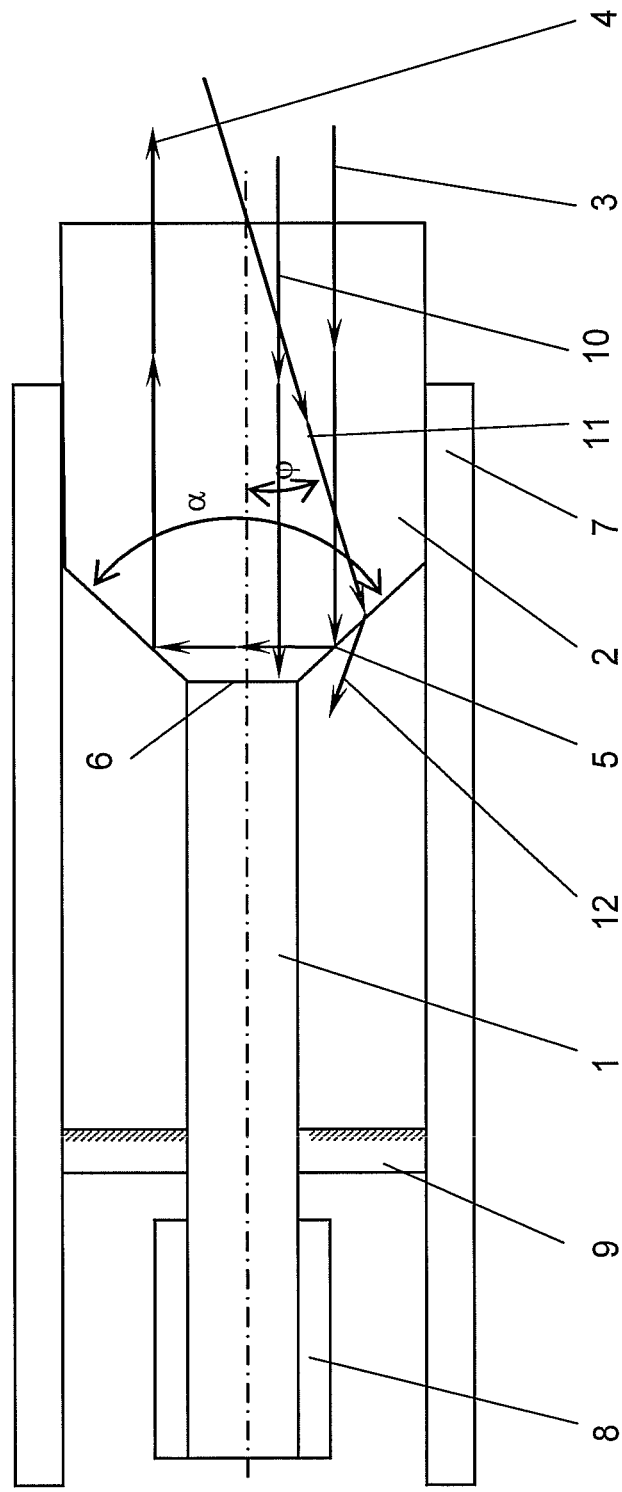
FIG. 3 is a diagram of a configuration utilizing a quartz block providing for a high damage threshold for polymeric coating or outer cladding of the fiber.

FIG. 3 illustrates possible paths of scattered backreflected light signals 3, 10 and 11, respectively, and a structure of termination assembly minimizing such a backreflected propagation and, therefore, providing for a high damage threshold for polymeric coating or outer cladding 8 of delivery fiber 1. The illustrated termination assembly includes a water-cooled housing the downstream end of which receives a quartz block 2 provided with a frusto-conically shaped cross-section. The upstream end 6 of block 2, if viewed in a forward direction of light propagation, is operably fuseable to the downstream end fiber 1. The water-cooled housing 7 further contains a washer 9 with a dielectric reflective coating (shown but not numbered) on its downstream side, and fiber 1 received in the upstream end of the housing and extending through washer 9. The diameter of upstream end 6 of block 2 is substantially equal or less than the outer diameter of fiber 1. The cone angle $\alpha$ is close to 90 degrees.

As back-reflected beams enter block 2, they may propagate along one of three paths: one is incident upon the conical part of the block (beam 3); the other is incident upon the fused end 6 (beams 10 and 11). First, if beam 3 propagates parallel to the optical axis, it reflects first at a point of internal reflection (point 5) and again from a conical surface at a second point of internal reflection, and exits block 2 as beam 4. Secondly, if beam 11 is incident at an angle $\phi$ relative to the optical axis, this beam may propagate through block, as is shown by beam 12. To protect protective layer 8 from beam 12, washer 9 (alternatively termed a "reflector" within the scope and spirit of the present disclosure) is located along the path proximate fiber 1 and configured to disperse beam 12 over housing 7.

In determining angle $\alpha$, if $\alpha$ is close to 90 degrees, then $\phi_0 = 45 - TIRquartz$, where TIR– is the angle of total reflection of quartz block 2, such that $TIRquartz = \arcsin 1/n$, where n is the refractive index of quartz, or, in principle, any other material that can be used for manufacturing the block 2.

If back-reflected beam 10 reaches the cladding of fiber 1, it is guided towards a protective layer including a protective layer 8 and may damage the latter. To protect protective layer 8 there are two embodiments of the present disclosure, as disclosed below.

Figure 4:
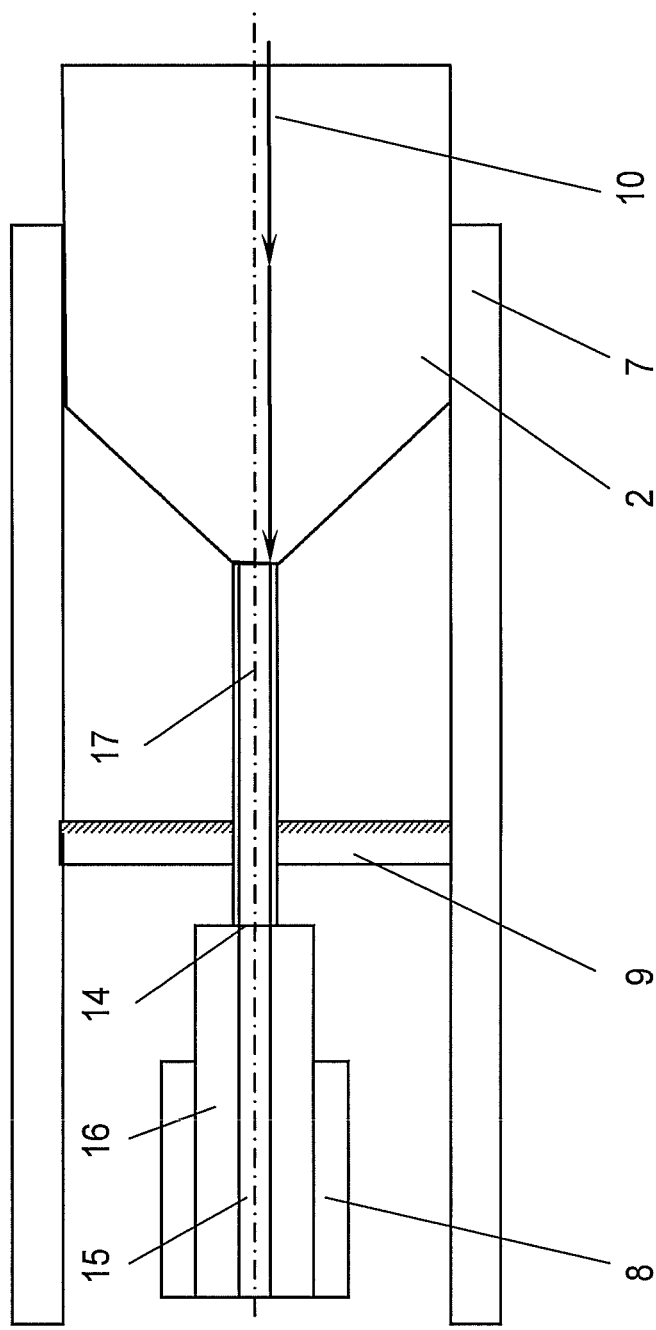
FIG. 4 is a diagram of the configuration of the termination block configured with a light guard operative to protect the coating of the delivery fiber from back-reflected light which was not blocked by the quartz block.

FIG. 4 illustrates the first embodiment of a termination assembly configured with disclosed quartz block 2 and a light guard unit which is operative to reduce coupling of backreflected light into a waveguiding cladding of delivery fiber 14. The light guard unit includes a combination of delivery fiber 14 and a passive end fiber 17. The fibers 14 and 17, respectively, are provided with a uniform core diameter, but have different outer diameters. The end fiber 17 is configured with a thin waveguiding cladding defining the outer diameter of the end fiber which is substantially equal to and fused to the upstream end of block 2. The delivery fiber has an inner cladding 16 defining an outer diameter that is larger than that one of end fiber 17. The passive fibers 14 and 17, respectively, are butt-spliced.

When backreflected light 10 is incident on the upstream end of block 2, it is coupled into and supported by both the core and cladding of end fiber 17. The power of backreflected light guided along the cladding of fiber 17 depends on the radial thickness of the cladding. Configuring this cladding with the thickness which is substantially smaller than that one of the cladding of delivery fiber 14, the power of light coupled into the latter is limited. As a consequence, the cladding of end fiber 17 is so configured that the power of backreflected light coupled into the waveguiding cladding of delivery fiber 14 is insufficient for damaging protective layer 8 of the latter.

Under certain circumstances it is possible to provide the upstream end of block 2 with a diameter smaller than the outer diameter of the fiber 17. In this case, the backreflected light should have diffraction with an angle smaller than above, calculated angle $\phi_0$. However the geometry of the fused ends of the respective block and end fiber are so selected that the light is coupled into the end fiber at an angle at which the cladding still will be able to guide it. Otherwise, the integrity of the cladding not supporting the coupled light may be compromised.

In a further modification of the embodiment illustrated in FIG. 4, end fiber 1 with core 17 can be manufactured without cladding at all. In that case, light would be guided along the air-quartz border and fully coupled into core 15 without touching protective layer 8.

Figure 5:
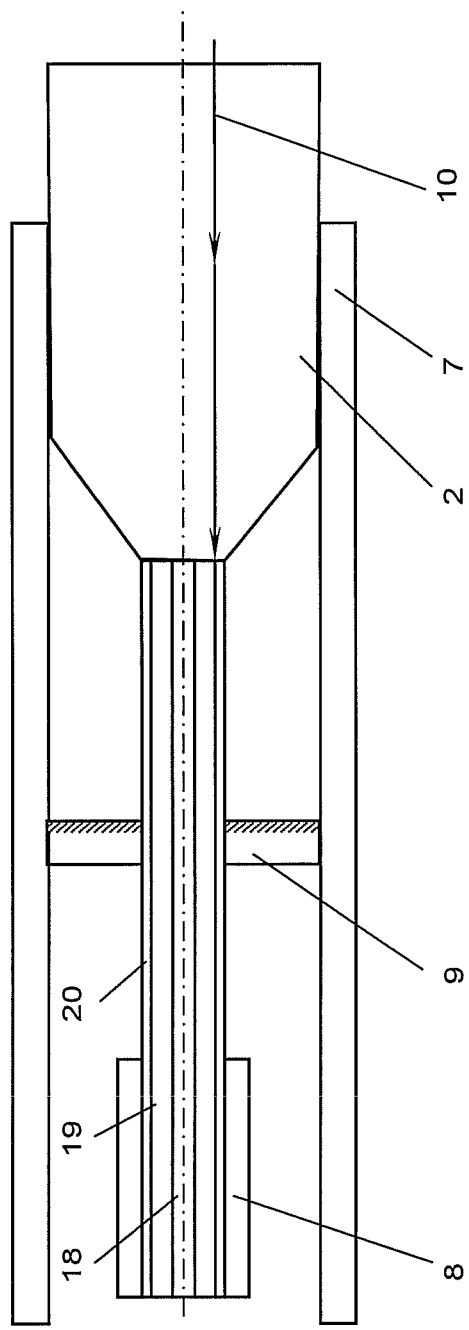
FIG. 5 is a diagram of the configuration of the termination block provided with an alternative embodiment of light guard.

FIG. 5 considered in conjunction with FIG. 6A illustrates an alternative embodiment including a single delivery fiber 18 which is configured with multiple inner and outer claddings 19 and 20, respectively. The latter defines the outer diameter of the downstream end of delivery fiber 18 configured to have substantially the same geometry as the fused thereto upstream end of block 2.

As indicated by the refractive index profile of FIG. 6A, the indices 204 and 206 of respective inner and outer cladding 19 and 20 are selected so that outer, relatively narrow outer cladding 20 has a smaller refractive index than inner cladding 20. The majority of backreflected light is coupled into the core and inner cladding of fiber 18. The outer cladding 20 has a radial dimension substantially smaller than that on of inner cladding 19. Accordingly, the power of backreflected light coupled into outer cladding 20 does not have a power sufficient to jeopardize the integrity of protective layer 8. More-over, a relatively powerful light coupled into and guided by inner cladding 19 is blocked by outer cladding 20 from coupling into protective layer 8.

FIG. 6B illustrates an alternative refractive index profile of delivery fiber 18 of FIG. 5. From inner to outer layer, there is shown a core 210 composed of silica glass (SiO2) (or other suitable material); an inner cladding 212 of fluorinated silica glass (SiO$_2$F) or other suitable material which has a lower refractive index than the core; a buffer cladding 214 of silica glass (SiO2) having substantially the same refractive index as that of core 210; and, an outer cladding 216 of fluorinated silica glass (SiO$_2$F). As constructed, the difference between indices of respective outer cladding and core should be at least twice as big as the difference. The backreflected light guided by inner cladding 212 is stripped by buffer cladding 214, but does not penetrate into protective layer 8 because outer cladding 216 has a lower refractive index than the buffer cladding. The fiber 18 is so configured that the difference in indices between respective core and outer cladding is at least twice as large as the difference between indices of respective core and inner cladding.

Figure 7A:
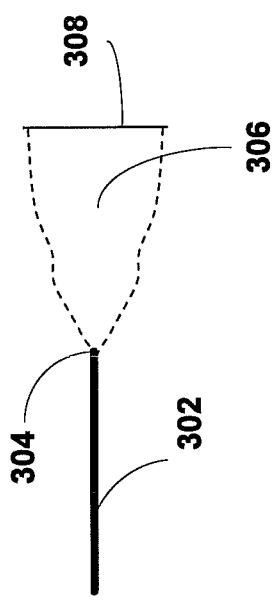
FIGS. 7A-7C illustrate respective embodiments of the quartz block that can be readily employed by the present disclosure while allowing for the use of practically unlimited diameter and cross-section of the input end of the block.
Figure 7B:
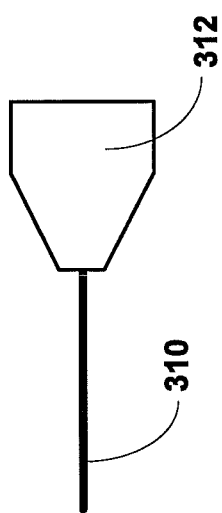
Figure 7C:
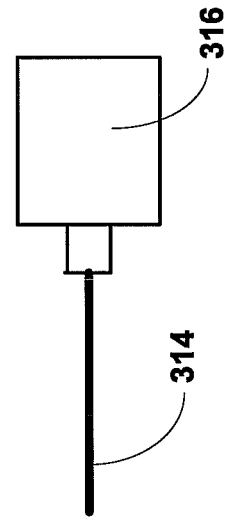

Turning then to FIGS. 7A, 7B and 7C, there are shown various embodiments of shapes, respectively 306, 312, and 316, for quartz blocks 2 having respective output ends 308, that can be readily employed by the present disclosure while allowing for the use of practically unlimited diameter of the downstream end of respective fibers 302, 310, and 314 because of the easily adaptable geometry of the downstream end of the disclosed block.

The disclosed block may have a conically shaped cross-section, stepwise or any other shape differing from the commonly used cylindrical shape. What is necessary is that the fuseable end have dimensions convenient for fusion. FIG. 7A depicts fiber 302 with a quartz block 306 having an arbitrary shape. There is an input end 304 and an output end 306. FIG. 7B depicts fiber 310 with a quartz block 312 having a conical shape. FIG. 7C depicts fiber 314 with a quartz block 316 having a stepped shape, although any steps form is suitable under the current discussion.

Having described at least one of the preferred embodiments of the present disclosure with reference to the accompanying drawings, it is to be understood that the disclosure is not limited to those precise embodiments, and that various changes, modifications, and adaptations may be effected therein by one skilled in the art without departing from the scope or spirit of the disclosure as defined in the appended claims.

What is claimed is:

1. A laser system comprising:
a delivery fiber guiding laser-generated light along a path in a forward propagating direction and having spaced upstream and downstream ends, the delivery fiber having a core, at least one waveguiding cladding and protective layer sequentially surrounding one another, the protective layer extending over a portion of the cladding;
a termination block having a frustoconical body expanding from an upstream end toward a downstream end thereof, the block being in optical contact to the downstream end of the delivery fiber and configured to retro reflect back-reflected light from an obstacle, which is located downstream from the termination block, in the forward propagation direction so that optical contact between the backreftected light and the delivery fiber and the protective layer of the delivery fiber is minimized.

2. The laser system of claim 1, wherein the termination block has an imaginary cone angle varying between about 65 and about 110° and is configured so that an inner surface thereof provides for a total reflection of the backreflected beams extending substantially parallel to an optical axis of the termination block and incident upon a region of the inner surface which extends radially outwards from the upstream end of the termination block.

3. The laser system of claim 1, wherein the protective layer terminates at a distance from the upstream end of the termination block and is selected from the group consisting of a polymeric coating and a SiF cladding, 4. The laser system of claim 1, wherein the downstream end of the delivery fiber is directly fused to and configured substantially identically to the upstream end of the termination block, the delivery fiber further having an outer cladding which extends between the waveguiding cladding and protective layer and has a refraction index less than that one of the cladding so as to minimize contact of the backreflected light, supported by the waveguiding cladding, with the protective layer.

5. The laser system of claim 1, wherein the downstream end of the delivery fiber is directly fused to and shaped and dimensioned substantially identically to the upstream end of the termination block, the delivery fiber further having a buffer cladding extending over the waveguiding layer, and an outer cladding between the buffer cladding and protective layers.

6. The laser system of claim 5, wherein the buffer cladding has a refraction index greater than that of the waveguiding cladding and the outer cladding has a refraction index smaller than that one of the waveguiding cladding, the delivery fiber being configured so that a difference between indices of respective core and waveguiding cladding is at least two times smaller than a diff between indices of respective core and outer cladding.

7. The laser system of claim 1 further comprising an end fiber having opposite ends fused directly to respective downstream end of the delivery fiber and upstream end of the block, the end fiber being configured with an outer waveguiding cladding around a core and having a radial thickness substantially smaller than that one of the core, wherein a downstream end of the end fiber is shaped substantially identically to the upstream end of the block and at most has an outer diameter substantially equal to that one of the upstream end of the block.

8. The laser system of claim 7, wherein the cores of respective delivery and end fibers are shaped and dimensioned substantially identically to one another, whereas a radial thickness of the waveguiding cladding of the delivery fiber is substantially greater than that one of the waveguiding cladding of the end fiber, 9. The fiber laser system of claim 2 further comprising a housing with an upstream end thereof which receives the delivery fiber and a downstream end Which receives the termination block, and a reflector mounted in the housing between the upstream end of the block and the protective layer.

10. The laser system of claim. 9, wherein the inner surface of the termination block is configured to refract backrefiected beams incident thereupon at an angle to the axis, the refracted beams further propagating over free space in the housing and being incident on the reflector which is configured to prevent the refractive beams from propagating upstream from the reflector.

11. The laser system of claim 7, wherein the delivery fiber is configured without the wavegui ding cladding.

12. The laser system of claim 1, wherein the termination block has a cross-section selected from the group consisting of frustoconical, stepwise and irregular cross-section.

13. A laser system emitting forward propagating light beam to treat a surface and having a housing supporting a termination block which is located upstream from the surface, the termination block being operative to protect a coating of a fiber laser fiber within the laser system from back-reflected beams of light and configured to retro reflect the backreflected light to the surface; the laser system further comprising:
- a delivery fiber, the delivery fiber having an acceptance end and a delivery end;
- a protective layer surrounding the delivery fiber;
- a washer, wherein the washer is contained within the housing and the delivery fiber passes through the washer before delivery of the light beam;
- at least one terminal block connector, the at least one terminal block connector further comprising a cone termination block;
- a reflector propagation of back-reflected light toward the protective layer; and
- a set of one or more light guards operable to minimize an optical contact between the protective layer and the back-reflected light, 14. The laser system of claim 13, wherein the termination block is comprised of quartz.

15. The laser system of claim 14, wherein the termination block is frustoconical in configuration and is fuseable to the delivery fiber.

16. The laser system of claim 13, wherein the housing is water-cooled.

17. The laser system of claim 13, wherein the protective layer of the delivery fiber is polymeric.

18. The laser system of claim 13, wherein the washer further comprises a dielectric reflective coating.

19. The laser system of claim 13, wherein the cone termination block is spliced to an output end of the delivery fiber.

20. The laser system of claim 17, wherein the cone termination block has a cone angle which is about 90 degrees so as to reduce propagation of back-reflected light to the polymeric coating inside the housing.

* * * * *